(12) United States Patent
Oka et al.

(10) Patent No.: US 11,823,451 B2
(45) Date of Patent: Nov. 21, 2023

(54) INFORMATION PROCESSING APPARATUS, INFORMATION PROCESSING METHOD, AND STORAGE MEDIUM FOR CLASSIFYING OBJECT OF INTEREST

(71) Applicant: CANON KABUSHIKI KAISHA, Tokyo (JP)

(72) Inventors: Ryuya Oka, Yokohama (JP); Atsushi Inoue, Tokyo (JP); Satoshi Igeta, Kawasaki (JP); Satoshi Ishizu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/983,585

(22) Filed: Nov. 9, 2022

(65) Prior Publication Data

US 2023/0068272 A1    Mar. 2, 2023

Related U.S. Application Data

(63) Continuation of application No. 16/773,033, filed on Jan. 27, 2020, now Pat. No. 11,526,709.

(30) Foreign Application Priority Data

Jan. 29, 2019   (JP) ................................. 2019-013337

(51) Int. Cl.
*G06V 20/20* (2022.01)
*G06V 10/764* (2022.01)
(Continued)

(52) U.S. Cl.
CPC ........ *G06V 20/20* (2022.01); *G06F 18/24323* (2023.01); *G06V 10/764* (2022.01); *G06V 10/945* (2022.01); *G06V 20/70* (2022.01)

(58) Field of Classification Search
None
See application file for complete search history.

(56) References Cited

U.S. PATENT DOCUMENTS 9,830,534 B1 * 11/2017 Ravichandran ......... G06F 18/24
10,289,636 B2 * 5/2019 Pfeifle .................... G06F 16/29
(Continued)

FOREIGN PATENT DOCUMENTS

CN    110213207 A  *  9/2019    ......... G06F 9/45504
CN    110213207 A       9/2019
(Continued)

*Primary Examiner* — Mohammed Rachedine
(74) *Attorney, Agent, or Firm* — Venable LLP

(57) ABSTRACT

An information processing method in which an object of interest is classified using node group information defining a node group having modeled a scheme of classification as a tree structure and having grouped nodes possessing a same parent node, comprises: setting depth information for determining whether to perform classification for a particular node group when sequentially traversing node groups from the parent node using the node group information to classify the object of interest; and classifying the object of interest by sequentially traversing node groups from the parent node using the node group information, and providing a classification result, wherein classifying the object of interest varies a depth up to which node groups are sequentially traversed from the parent node to classify the object of interest, in accordance with setting of the depth information.

17 Claims, 12 Drawing Sheets

(51) Int. Cl.
  *G06V 10/94* (2022.01)
  *G06V 20/70* (2022.01)
  *G06F 18/243* (2023.01)

(56) References Cited

U.S. PATENT DOCUMENTS

| | | | | |
|---|---|---|---|---|
| 10,551,431 | B1* | 2/2020 | Yang | G06F 30/30 |
| 2015/0358219 | A1* | 12/2015 | Kanda | H04L 41/0896 |
| | | | | 709/224 |
| 2018/0262333 | A1* | 9/2018 | Kamijoh | H04L 9/14 |
| 2019/0102701 | A1* | 4/2019 | Singaraju | G10L 15/063 |
| 2019/0371046 | A1* | 12/2019 | Trousdale | G06F 16/9027 |
| 2020/0029071 | A1* | 1/2020 | Kang | H04N 19/119 |
| 2020/0162729 | A1* | 5/2020 | Lee | H04N 19/18 |
| 2021/0105477 | A1* | 4/2021 | Koo | H04N 19/30 |

FOREIGN PATENT DOCUMENTS

| | | | | |
|---|---|---|---|---|
| JP | 2011-028519 A | 2/2011 | | |
| WO | 2018182454 A1 | 10/2018 | | |
| WO | WO-2018182454 A1 * | 10/2018 | ............. | G06F 17/30 |

\* cited by examiner

FIG. 3

| | 301 | 302 | 303 | 304 | 305 | 306 | 307 | 308 | 309 | 310 | 311 |
|---|---|---|---|---|---|---|---|---|---|---|---|
| | MANAGE-MENT NUMBER | MANAGE-MENT NUMBER LIST OF PARENT NODE | CLASSIFI-CATION RESULT OF PARENT NODE | RELATED NODE MANAGEMENT NUMBER LIST | SIZE OF INFERENCE MODEL (byte) | REFERENCE PROCESSING TIME (ns) | PRIORITY ORDER | NUMBER OF USES | VERSION | CAPABILITY REQUIRED FOR PROCESS-ING | BINARY OF INFERENCE MODEL |
| 312 | 101 | | | | 300 | 20 | 1 | 400 | 1.5 | GPU | XXX |
| 313 | 102 | | | | 350 | 50 | 2 | 20 | 1.2 | CPU | XXX |
| 314 | 103 | 101,102 | FELIFORMIA | | 350 | 20 | 1 | 400 | 1.6 | GPU | XXX |
| 315 | 104 | 101,102 | PINNIPEDIA | | 280 | 25 | 1 | 400 | 1.3 | GPU | XXX |
| 316 | 105 | 103 | CANIDAE | | 320 | 30 | 1 | 400 | 1.7 | GPU | XXX |
| 317 | 106 | 103 | FELIDAE | | 400 | 50 | 1 | 200 | 1.8 | GPU | XXX |
| 318 | 107 | 105 | CANIS | | 450 | 100 | 1 | 200 | 2.0 | GPU | XXX |
| 319 | 108 | 106 | FELIS | | 250 | 90 | 1 | 400 | 1.2 | GPU | XXX |
| 320 | 109 | 108 | DOMESTIC CAT | | 450 | 110 | 1 | 200 | 1.9 | GPU | XXX |
| 321 | 111 | | | 107,109 | 290 | 150 | 2 | 100 | 1.2 | GPU | XXX |
| 322 | 113 | | | | 350 | 200 | 2 | 100 | 1.2 | GPU | XXX |

| 109 |
|---|
| ... |

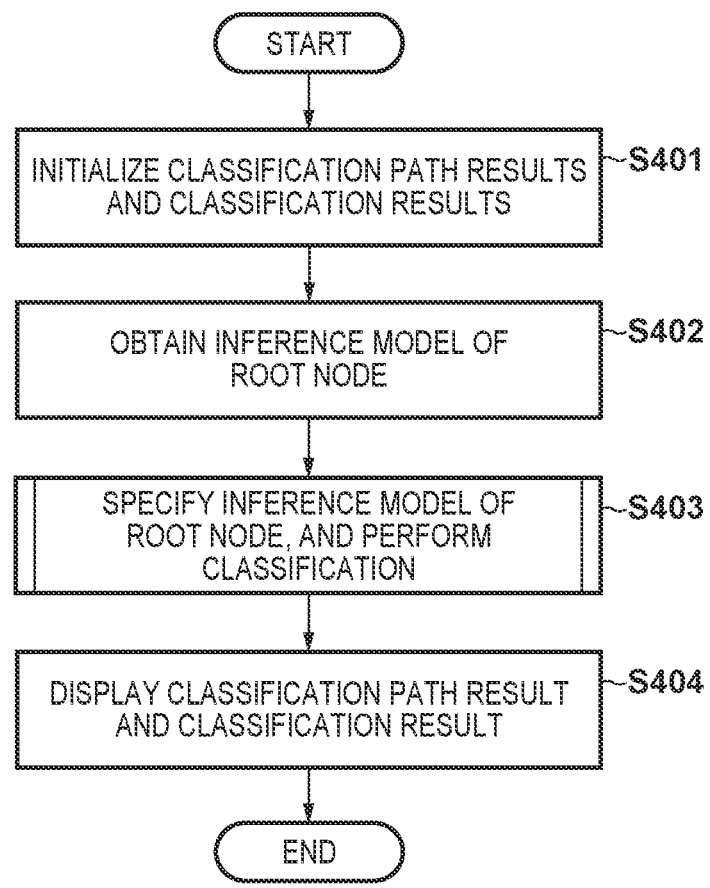

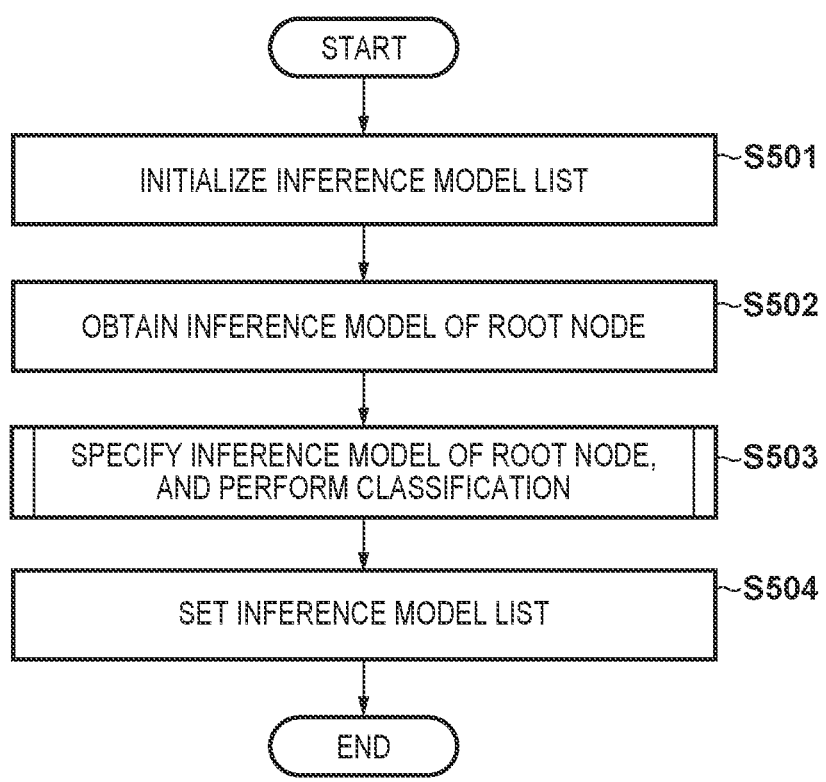

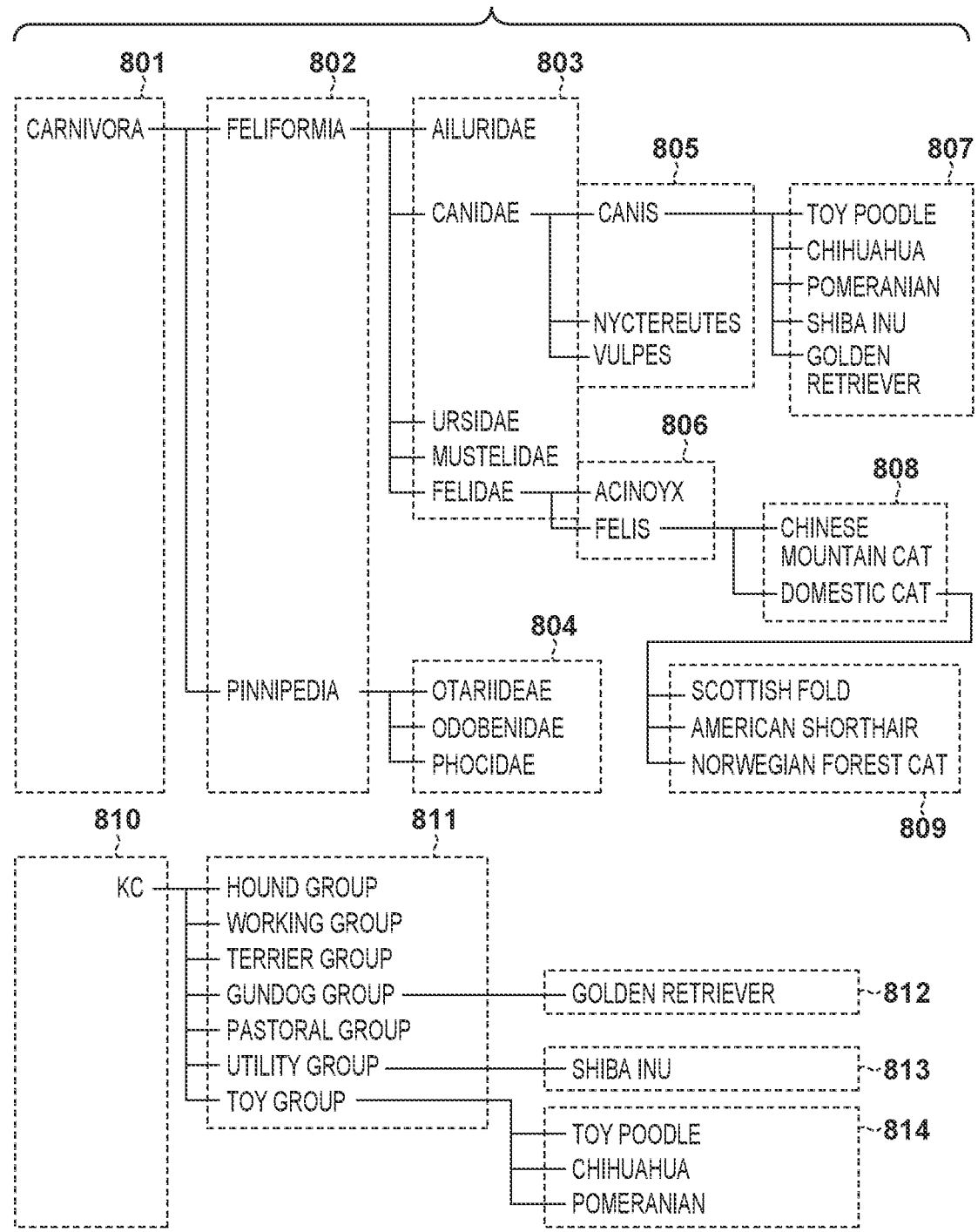

INFORMATION PROCESSING APPARATUS, INFORMATION PROCESSING METHOD, AND STORAGE MEDIUM FOR CLASSIFYING OBJECT OF INTEREST

CROSS-REFERENCE TO RELATED APPLICATION

This application is a Continuation of U.S. application Ser. No. 16/773,033, filed Jan. 27, 2020, which claims priority to Japanese Patent Application No. 2019-013337, filed Jan. 29, 2019, the entirety of both of which are hereby incorporated by reference.

BACKGROUND OF THE INVENTION

Field of the Invention

The present invention relates to an information processing apparatus, an information processing method, and a storage medium for classifying an object of interest.

Description of the Related Art

In recent years, improved processing capability and increased storage capacity of computers have been promoting the use of machine learning algorithms that learn and classify a large amount of accumulated data to identify the classification to which the data to be newly processed belong.

There is known a technique that classifies data based on a tree-structure model using a decision tree algorithm, which is one of the aforementioned machine learning algorithms. Japanese Patent Laid-Open No. 2011-28519 discloses a decision tree generation technique that, when generating a decision tree, allows for a shortened processing time by taking into account the calculation cost for calculating feature from the learning data, in addition to impurities indicating an insufficient classification accuracy when branching the data.

However, when classifying an object of interest based on a tree-structure model for image analysis or the like, the depth of required classification may differ, because the significance of the concept of interest differs according to the user. It is therefore necessary, in order to achieve classification suited for each user, to construct an inference model such as a decision tree for each user. It may also be necessary to reconstruct the inference model that performs classification each time the required depth of classification varies according to the user over time. However, there is a problem that reconstructing the inference model each time using a large amount of data is time consuming and requires a large computational cost.

SUMMARY OF THE INVENTION

The present disclosure has been made in consideration of the aforementioned issues, and proposes a technique that allows obtaining a classification result at a level required by the user without generating an inference model that performs classification each time.

In order to solve the aforementioned problems, one aspect of the present disclosure provides an information processing method in which an object of interest is classified using node group information defining a node group having modeled a scheme of classification as a tree structure and having grouped nodes possessing a same parent node, the method comprising: setting depth information for determining whether to perform classification for a particular node group when sequentially traversing node groups from the parent node in the tree structure using the node group information to classify the object of interest; and classifying the object of interest by sequentially traversing node groups from the parent node in the tree structure using the node group information, and providing a classification result, wherein classifying the object of interest varies a depth up to which node groups are sequentially traversed from the parent node to classify the object of interest, in accordance with setting of the depth information.

Another aspect of the present disclosure provides, an information processing apparatus that classifies an object of interest using node group information defining a node group having modeled a scheme of classification as a tree structure and having grouped nodes possessing a same parent node, the apparatus comprising: one or more processors; and a memory storing instructions which, when the instructions are executed by the one or more processors, cause the information processing apparatus to function as: a setting unit configured to set depth information for determining whether to perform classification for a particular node group when sequentially traversing node groups from the parent node in the tree structure using the node group information to classify the object of interest; and a processing unit configured to classify the object of interest by sequentially traversing node groups from the parent node in the tree structure using the node group information, and provide a classification result, wherein the processing unit varies a depth up to which node groups are sequentially traversed from the parent node to classify the object of interest, in accordance with setting of the depth information.

Still another aspect of the present disclosure provides, a non-transitory computer-readable storage medium storing a program for causing an information processing apparatus that classifies an object of interest using node group information defining a node group having modeled a scheme of classification as a tree structure and having grouped nodes possessing a same parent node to execute an information processing method, the information processing method comprising: setting depth information for determining whether to perform classification for a particular node group when sequentially traversing node groups from the parent node in the tree structure using the node group information to classify the object of interest; and classifying the object of interest by sequentially traversing node groups from the parent node in the tree structure using the node group information, and providing a classification result, wherein the classifying the object of interest varies a depth up to which node groups are sequentially traversed from the parent node to classify the object of interest, in accordance with setting of the depth information.

According to the present invention, it becomes possible to obtain a classification result at a level required by the user without generating an inference model that performs classification each time.

Further features of the present invention will become apparent from the following description of exemplary embodiments (with reference to the attached drawings).

BRIEF DESCRIPTION OF THE DRAWINGS

FIG. 3 is an explanatory diagram of an example of a data structure of a management table, according to the first embodiment.

FIGS. 4A to 4B are flowcharts illustrating an operation of a process for displaying a classification result, according to the first embodiment.

FIGS. 5A to 5B are flowcharts illustrating an operation of a process for outputting the classification result to the outside, according to the first embodiment.

FIGS. 8A to 8B are explanatory diagrams of an example of classification using the tree structure, according to the second embodiment.

DESCRIPTION OF THE EMBODIMENTS

Figure 1:
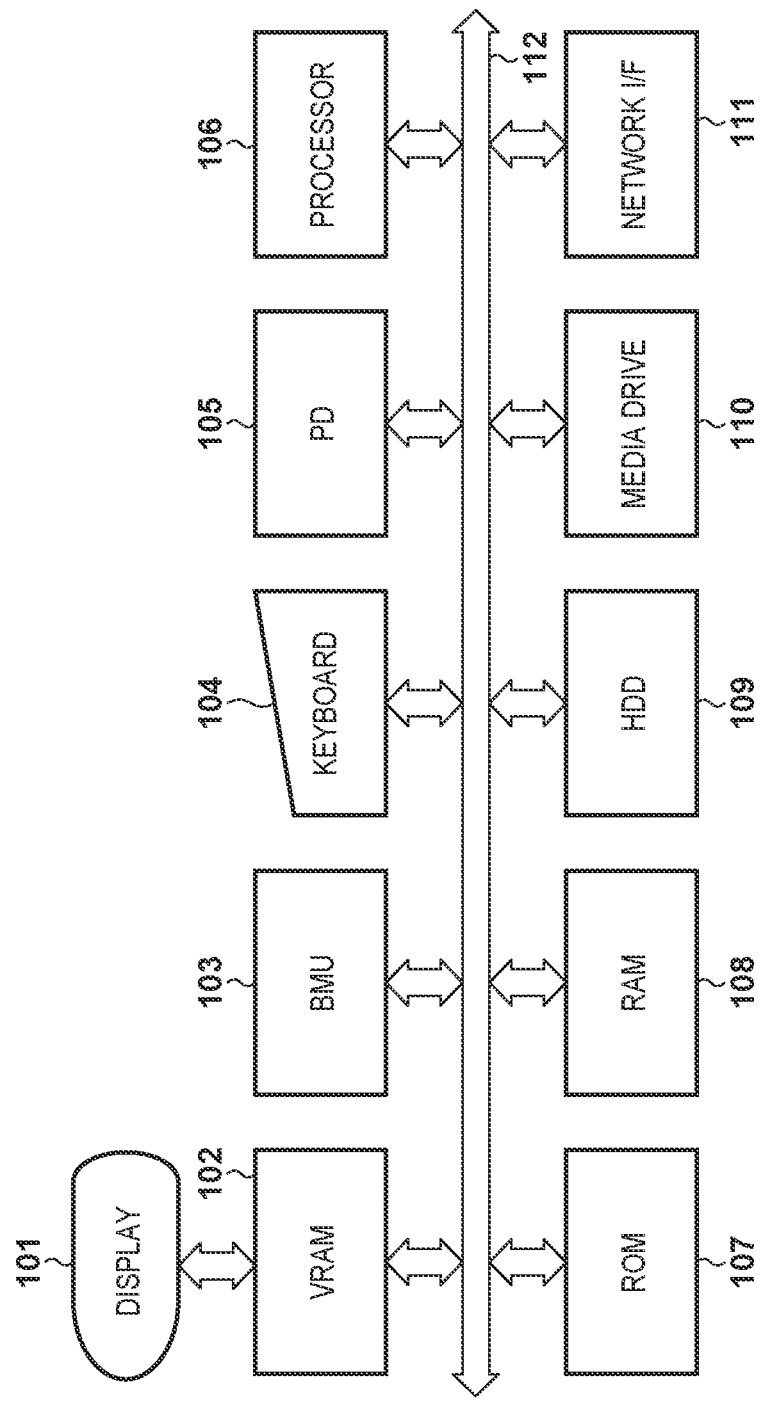
FIG. 1 is a block explanatory diagram of an example of a functional configuration of an image processing apparatus according to a first embodiment.

In the following, embodiments will be described in detail, referring to the accompanying drawings. Note that the following embodiments are not intended to limit the invention according to the claims. Although a plurality of features are described in the embodiments, not all of the plurality of features are essential for the invention, and the plurality of features may be combined in an arbitrary manner. Furthermore, in the accompanying drawings, identical or similar components are provided with same reference numerals, with duplicate description being omitted.

First Embodiment

As an example of an information processing apparatus, there will be described an example that uses a personal computer (PC) that can perform classification using an inference model. However, without being limited to PCs, the present embodiment may also be applied to other devices that can perform classification using an inference model. Such devices may include, for example, digital cameras, mobile phones including smartphones, gaming devices, tablet terminals, watch-type or eyeglass-type information terminals, medical devices, devices for surveillance systems or, vehicle-mounted systems, or the like.

Configuration of PC

FIG. 1 is a block diagram illustrating an exemplary functional configuration of a personal computer (PC) 100 as an example of information processing apparatus of the present embodiment. Note that one or more of the functional blocks illustrated in FIG. 1 may be realized by hardware such as an ASIC or a programmable logic array (PLA), or may be realized by execution of software by a programmable processor such as a CPU or a GPU. A combination of software and hardware may be used for the implementation.

The PC 100 includes a display 101, a VRAM 102, a BMU 103, a keyboard 104, a PD 105, a processor 106, a ROM 107, a RAM 108, an HDD 109, a media drive 110, a network I/F 111, and a bus 112.

The display 101, including a display panel made of liquid crystal or organic EL, for example, displays, in response to an instruction from the processor 106, user interface information for operating the PC 100 such as, for example, icons, messages, menus, or the like. The VRAM 102 temporarily stores images for display on the display 101. The image data stored in the VRAM 102 is transferred to the display 101 according to a predetermined rule, whereby an image is displayed on the display 101. The BMU 103 controls data transfer between memories (e.g., between the VRAM 102 and another memory), or data transfer between the memory and each I/O device (e.g., network I/F 111).

The keyboard 104, including various keys for inputting characters or the like, transmits data input by user operation to the processor 106. The PD (pointing device) 105 is used, for example, to indicate content such as an icon, a menu, or the like, displayed on the display 101, or to drag and drop an object.

The processor 106 loads and executes on the RAM 108 control programs such as the OS or programs described below, which is read from the ROM 107, the HDD 109, or the media drive 110, so as to control the entire operation of the PC 100. In addition, the processor 106 performs a classification process described below.

The ROM 107 stores various control programs and data. The RAM 108 has a work area, a data save area during error processing, a control program load area, or the like, of the processor 106. The HDD 109 stores respective control programs to be executed on the PC 100, or data such as temporarily stored data. In addition, the HDD 109 stores node group information and data of a management table, which will be described below.

The network I/F 111 communicates with other information processing apparatuses, printers, or the like, via a network. The bus 112 includes an address bus, a data bus, and a control bus. Note that the control programs may be provided to the processor 106 from the ROM 107, the HDD 109, or the media drive 110, or may be provided from other information processing apparatuses, or the like, over a network via the network I/F 111.

Example of Classification Using Tree Structure

Figure 2A:
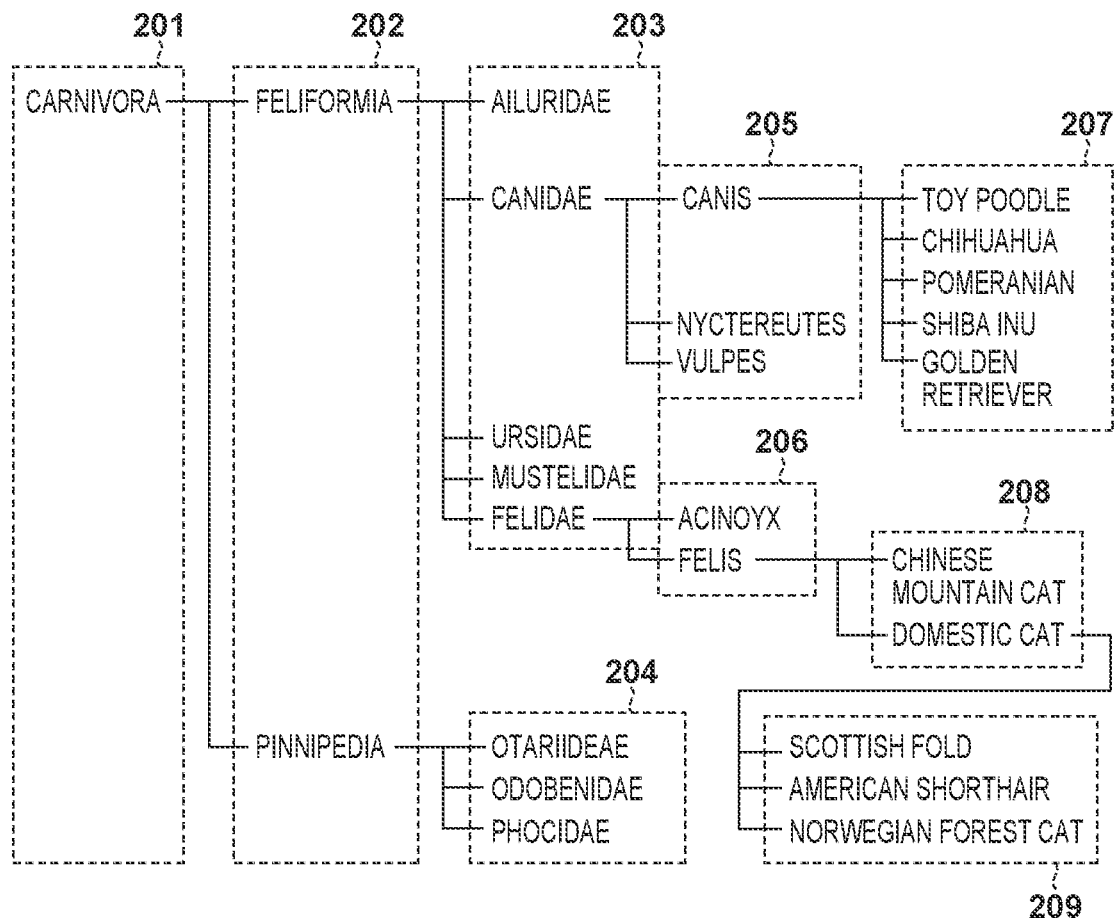
FIGS. 2A to 2C are explanatory diagrams of an example of an inference model organized into a tree structure, according to the first embodiment.
Figure 2B:
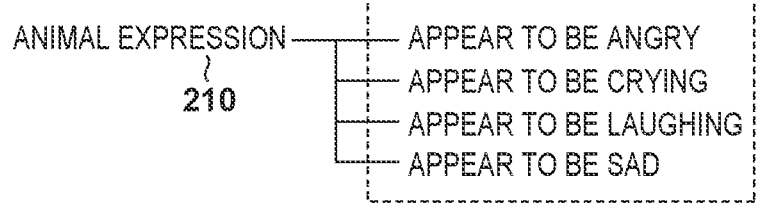
Figure 2C:
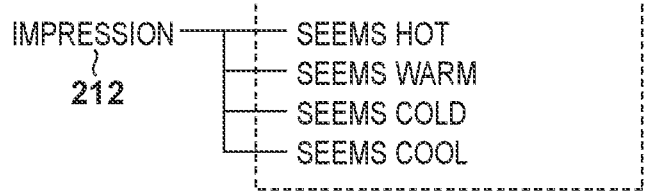

FIGS. 2A to 2C schematically illustrate an example of node group information represented as a tree structure of an inference model. The node group information may have one or more mutually independent schemes of classification, with nodes with the same parent in the tree structure being grouped for each classification. The node group information may be used, for example, for classifying a subject in an image captured by an unillustrated digital camera, or the like, and presenting the classification result to the user. With regard to the level at which an object is to be classified and presented to the user, the required level may vary according to the user. Therefore, as described below, depth information (depth list described below) is used to control for each user the depth when classifying an object of interest. Hereinafter, the node group information will be described in detail.

FIG. 2A illustrates an example of node group information for several types of animals. A node group 201 forms a node group with other unillustrated nodes having the same node including "*Carnivora*" as the parent of the nodes. Note that, for convenience of explanation, there is not illustrated a superordinate concept including a root node which turns out to be the root of "*Carnivora*". A node group 202, which is a node group having the node "*Carnivora*" as the parent of the nodes, includes nodes "Feliformia" and "Pinnipedia". Node groups 203 to 209 indicate node groups having the same node as the parent of the nodes, similarly to the node group 202.

In the present embodiment, such an inference model is managed using a data configuration described below referring to FIG. 3. FIG. 2B illustrates a configuration usable in one or more node groups illustrated in FIG. 2A (being in dependency with the tree structure illustrated in FIG. 2A), and also organized into a tree structure that provides a classification with a different perspective from that of FIG. 2A.

Numeral 210 indicates an independent root node. Numeral 211 indicates a node group of nodes having the numeral 210 as the same parent. For example, the node group 211, which is a node group classifying nodes of "animal expression", may be used in combination with the classification by a node group 207 representing types of dogs, or a node 209 representing types of cats. The node groups organized in the aforementioned manner are also generated as an inference model provided that respective node groups are classified under a parent node, the inference model being managed using a data configuration described below referring to FIG. 3.

Furthermore, FIG. 2C illustrates a structure organized into a tree structure providing a classification in a different perspective from that of FIGS. 2A and 2B. Numeral 212 indicates a root node independent of the tree structure illustrated in FIG. 2A. In addition, numeral 213 indicates a group of nodes having the numeral 212 as the parent of the nodes. For example, the numeral 213 is a node group for classifying "impression" without any dependency with the classification of FIGS. 2A and 2B, and therefore may be independently used. The node groups organized in the aforementioned manner are also generated as an inference model provided that respective node groups are classified under a parent node, the inference model being managed using a data configuration described below referring to FIG. 3.

FIG. 3 illustrates an example of a data configuration held by the PC 100 of the present embodiment. FIG. 3 illustrates an example of a management table (management table 300) of the inference model illustrated in FIGS. 2A to 2C, and a depth list to be set using management numbers of management records of the inference model. For example, in the example of depth list illustrated in FIG. 3, there is set a management record having a management number "109". Note that, for convenience of explanation in the present example, "Carnivora", which is a node group including other nodes (not illustrated) having the same node as the parent, is treated as a root node. In addition, for convenience of explanation, management of the inference model corresponding to all the node groups explained in FIGS. 2A to 2C is not described.

In FIG. 3, a column 301 indicates management numbers of nodes in the inference model, and a column 302 indicates management numbers of parent nodes in the inference model. It can be seen that management numbers "101" illustrated in FIG. 3 (i.e., the record indicated by a row 312) and "102" (i.e., the record indicated by a row 313) are root nodes. Since the aforementioned nodes have no parent node, there is no management number set to the column 302 (management number list of parent nodes). In addition, also for tip nodes (also referred to as leaf nodes), there exist no other records having management numbers of leaf nodes as management numbers of parent nodes.

A column 303 indicates classification results of parent nodes. Using the inference model having coinciding classification results of parent nodes allows performing more detailed classification. For a root node, which does not have a parent node, the classification results of parent nodes are not set. Using the management table as described above allows managing the tree structure illustrated in FIG. 2A.

A column 304 indicates a related node management number list. Columns 305 to 310 indicate parameters of the inference model. In other words, the present embodiment manages node groups of node group information and parameters related to the node groups (e.g., the column 305 (size of inference model) or the column 307 (order of priority)) in an associated manner. Accordingly, it is possible to vary the depth of classification in accordance with the environment or the device on which the process is performed, when providing classification results or providing an inference model to those other than the PC managing the inference model via a process described below referring to FIGS. 5A to 5B. In other words, it becomes possible to select an optimal inference model when performing classification. Note that the parameters may be used alone or in combination when selecting the inference model.

For example, referencing the values in the column 306 (reference processing time) allows determining, in an environment that requires processing within a certain time, a process that may be performed within a required time based on the processing time taken so far, and implementing an optimal inference model. Alternatively, a utilization rate may be determined using the values in the column 308 representing the number of uses, so as to compress data of inference models (e.g., node groups) below a predetermined utilization rate. In addition, data of inference models below a predetermined utilization rate may also be stored in a storage which is slower than the storage storing the node group information.

Note that parameters are not essential because it is possible to perform a classification suited for the user using a required model even though the model is lacking parameters. In addition, the parameters illustrated in FIG. 3 are an example, in which the items and the numbers of items are non-limiting.

A column 311 indicates binary data of inference models corresponding to management numbers. Note that, for convenience of explanation, although an example is illustrated in which the data in the column 311 are represented as binary numbers in inference models, the data may be indicated by a pointer, or the like, to files of the inference models.

Rows 312 and 313 both indicate records corresponding to the node group 201 illustrated in FIG. 2A. The rows 312 and 313 correspond to the same node group, but are different in terms of required processing capabilities. For example, the column 310 indicates that although a GPU is required for processing the management record of the row 312, the management record of the row 313 may be processed using only a CPU. Accordingly, the present embodiment allows managing, together with associated parameters, a plurality of inference models that can apply different processes to the same classification. This allows, when providing an inference model to a device other than the PC 100 managing inference models, the device to select an inference model in accordance with the ability of the device via the processes illustrated in FIGS. 5A to 5B described below.

Furthermore, the rows 314, 315, 316, 317, 318, 319, 320 respectively indicate management records corresponding to the node groups 203, 204, 205, 206, 207, 208, 209 illustrated in FIG. 2A. A row 321 indicates a management record of node group 211 illustrated in FIG. 2B. In the management record of the row 321, the management number "107" and the management number "109" are set as a list to the item in the column 304 indicating the related node management number list. The foregoing indicates that the list may be used together with classification of the node group 207 indicating the types of dogs or the node group 209 indicating the types of cats illustrated in FIG. 2A.

A row 322 indicates a management record corresponding to the node group 213 illustrated in FIG. 2C. In the row 322, neither the column 302 indicating the management number of the parent node nor the column 304 indicating the related node management number list has been set. Therefore, it can be seen that the node group 213 classifying the "impression" illustrated in FIG. 2C is independently available without any dependency with other nodes. Using the aforementioned data structure allows managing inference models for each node group, and easily updating individual inference models, and adding or modifying a plurality of inference models having different classifications. In other words, appropriately updating inference models with a low determination rate (for example, updating models by learning) allows easily improving the precision of inference, and easily improving the efficiency of inference by increasing the efficiency and updating frequently used inference models.

The depth information list 323 illustrated in FIG. 3 turns out to be a list indicating that processing will not be performed up to a classification deeper than that of a specified management number. The depth information described above is used to determine whether to perform classification for a particular node group when sequentially traversing node groups from the parent node in the tree structure using the node group information to classify an object of interest. In other words, the depth up to which node groups are sequentially traversed from the parent node for classification is varied by preventing execution of classification up to a deeper depth than that of a particular node group in accordance with the setting of the depth information.

In the example illustrated in FIG. 3, an item 324 indicates the management number "109", which is the first management number not to be processed. In other words, the item 324 indicates that, although classification is not performed on the types of cats represented by the management number "109" (node group 209), classification is performed on the types of dogs represented by a management number "107" which has not been set. Specifying a management number not to be processed as described above makes it possible to manage the depth of classification. Note that, for convenience of explanation, there is illustrated an example that does not take into account user-wise specification in a list of management numbers not to be processed. However, preparing a list of management numbers for inference models not to be processed for each user allows managing depths suited to the user's interest according to the user. Although an example of a list indicating management numbers for inference models "not to be processed" has been described referring to FIG. 3, it is also possible to manage classification depths by preparing a list of management numbers for inference models "to be processed" as the depth list.

Classification Process on Tree Structure

Figure 4B:
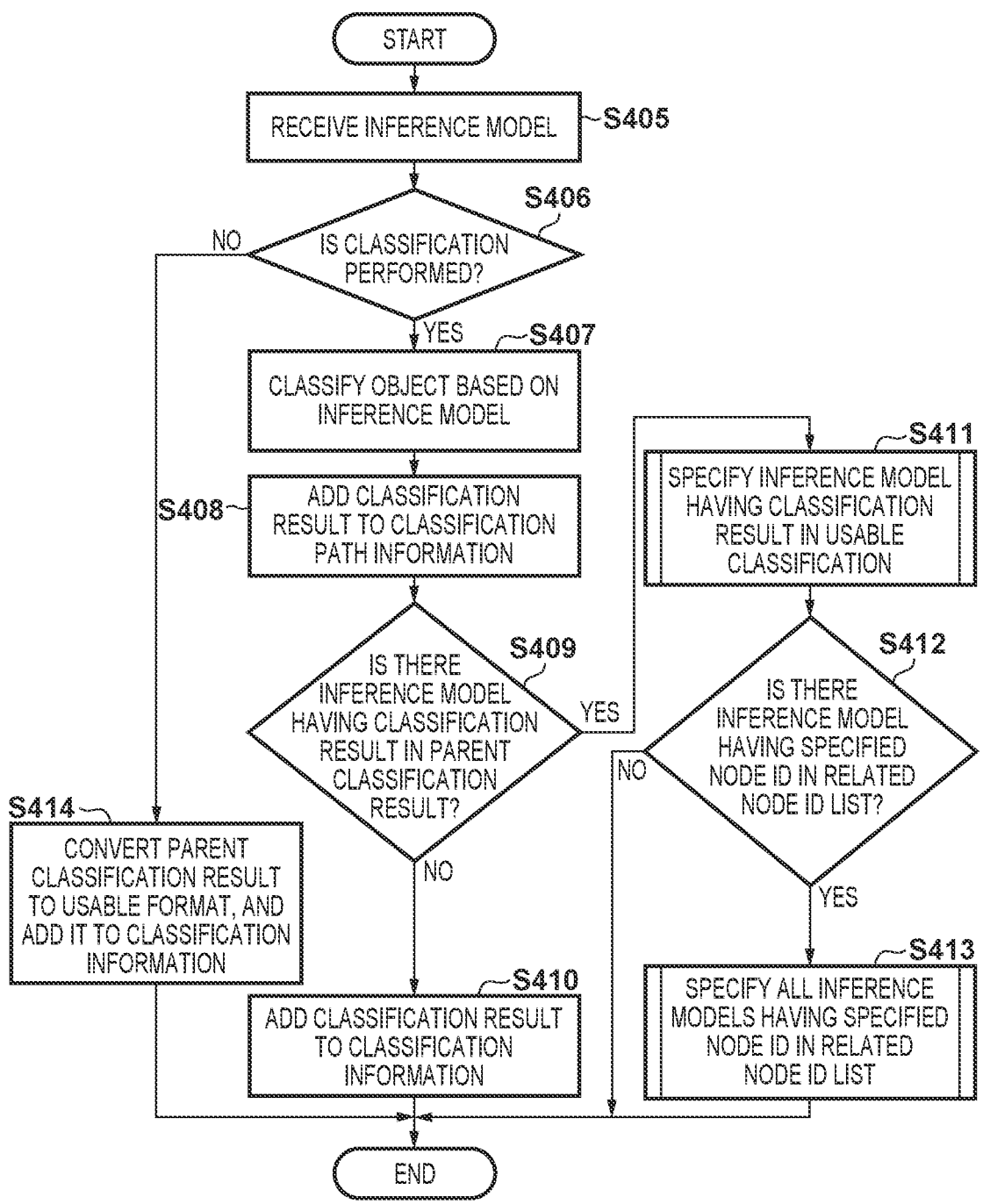

Next, an operation of the classification process in the PC 100 of the present embodiment will be described referring to FIGS. 4A and 4B. The processes illustrated in FIGS. 4A and 4B are realized by loading and executing on the RAM 108, by the processor 106 of the PC 100, a program stored in the ROM 107 or the HDD 109. Note that, the process illustrated in FIG. 4B is called by the process illustrated in FIG. 4A, and the process is performed along the tree structure in sequence from each root node. In addition, the process illustrated in FIG. 4B is repeatedly performed by a recursive call for sequentially processing parent-child relations in the tree structure.

At step S401, the processor 106 of the PC 100 initializes the data indicating classification path results and classification results. Subsequently, at step S402, the processor 106 obtains an inference model of the root node. In the example illustrated in FIG. 3, for example, the processor 106 obtains, as a processing subject, an inference model managed by records of the rows 312, 313 and 322 in which neither the column 302 (parent node management number list) nor the column 304 (related node management number list) has been set. Note that the rows 312 and 313 correspond to the node group 201 illustrated in FIG. 2A, and the row 322 corresponds to the node group 213 illustrated in FIG. 2C.

At step S403, the processor 106 performs (calls step S405) the classification process illustrated in FIG. 4B on the inference model of the root node obtained at step S402. Note that, although not explicitly stated in the operation illustrated in FIG. 4A, the classification process in FIG. 4B is performed for a plurality of times in accordance with the number of root nodes in a case where there exists a plurality of root nodes obtained at step S402. On this occasion, the processing at and after step S405 illustrated in FIG. 4B may be performed sequentially or in parallel. In addition, the order of calling step S405 may be controlled using, for example, the values in the column 307 (priority order) according to the data configuration illustrated in FIG. 3, so that models with priority order equal to or higher than a predetermined priority are selected for processing. Furthermore, the process may be controlled using the values in the column 307 (priority order) described above in a case where there exists a plurality of inference models based on different schemes intended for a same classification. For example, with the data configuration illustrated in FIG. 3, the records of the rows 312 and 313 are inference models based on different schemes directed to the same classification. Therefore, the inference model represented by the record of the row 312 in which the priority order of the column 307 has been set higher may be used more preferentially than the inference model indicated by the record of the row 313 (or the record of the row 313 may be prevented from being used). Processing a plurality of root nodes in the aforementioned manner allows performing different classifications such as classifications of inference models based on different schemes, or types and impressions of animals (i.e., the rows 312 and 322).

At step S404, the processor 106 displays the classification path result and the classification result obtained at step S403. For example, the processor 106 displays, on the display 101, a "*Carnivora*, Feliformia, Canidae, *Canis*, Golden Retriever" as the classification path result, and "Golden Retriever" as the classification result. Note that, for convenience of explanation, S404 has been explained taking as an example a case of displaying the analysis result or the like on the display 101. However, when using the classification result or the like for further processing on the PC 100, such as dynamic prediction in accordance with the subject being shot, the result of processing may be used for processing on the PC 100 without displaying on the display 101.

At step S405, the processor 106 receives the inference model specified at step S403. Note that step S405 may also be called from steps S411 and S413 described below. In the aforementioned case, the processor 106 receives the inference model specified at steps S411 and S413. At step S406, the processor 106 determines whether to perform classification using the specified inference model. The processor 106, upon determining to perform classification using the specified inference model, advances the process to step S407. On the other hand, the processor 106, upon determining not to perform classification using the specified inference model, advances the process to step S414. For example, in the data configuration illustrated in FIG. 3, 109 is set as the management number for an inference model not to be processed in the list 323 of management numbers for inference models not to be processed, as a depth in accordance with the user's interest. Therefore, when the management number of the specified inference model is 109, it is determined not to perform classification for the specified inference model, and the process proceeds to step S414. Note that, the processor 106, when performing depth adjustment using the list of management numbers of inference models to be processed instead of the list of management numbers of inference models not to be processed, advances the process to step S414 upon determining that the specified inference model does not exist in the list. This allows performing classification at a depth satisfying the user's interest can be performed.

In addition, the processor 106 may also refer to the column 306 (reference processing time) in the data configuration illustrated in FIG. 3, for example. For example, the processor 106 may advance the process to step S414 upon determining that a predetermined processing time is exceeded based on the elapsed time of the process from step S401 and the reference processing time of the specified inference model. In other words, it is possible to appropriately control the depth up to which node groups are sequentially traversed from the parent node, when performing a classification process required to be completed within a certain time period.

At step S407, the processor 106 classifies an object based on a specified inference model. The object to be processed is, for example, a captured image which has been preliminarily specified to be processed. For example, the processor 106 uses a decision tree algorithm to classify the object as an item belonging to one of the node groups illustrated in FIG. 2A. Note that, at the current step, classification may be performed using deep learning or other machine learning algorithms instead of a decision tree algorithm to recognize the object so that the recognition result corresponds to one of the items belonging to the node groups. Further at step S408, the processor 106 of the PC 100 adds the result of classification performed at step S407 to the classification path result. On this occasion, the processor 106 may register the depth to the classification path result.

At step S409, the processor 106 determines whether there exists an inference model having the result of classification performed at step S407 as the parent classification result. The processor 106 advances the process to step S411 upon determining that there exists an inference model having the result of classification performed at step S407 as the parent classification result, or advances the process to step S410 upon determining that there is no inference model having the classification result as the parent classification result. For example, in the data configuration illustrated in FIG. 3, a record in the column 303 (classification result of the parent node) is obtained to determine the result of classification performed at step S407.

At step S410, the processor 106 adds the result of classification performed at step S407 to the classification result. Subsequently, the processor 106 returns the process to the caller (i.e., advances the process to S404).

At step S411, the processor 106 specifies the inference model determined at step S409 (the inference model having the result of classification performed at step S407) and subsequently calls step S405 to perform the process. In other words, the processor 106 recursively perform the process of FIG. 4B, by specifying different inference models. Note that, although not illustrated in FIG. 4B, the processor 106 performs the process as many times as the number of inference models in a case where there exists a plurality of inference models obtained. On this occasion, the processor 106 may call step S405 sequentially, or in parallel, to perform the process. In addition, the order of calling step S405 may be controlled using, for example, the values in the column 307 (priority order) according to the data configuration illustrated in FIG. 3. Furthermore, in a case where there exists a plurality of inference models of different types for the same classification, the object to be processed may be controlled using, for example, the values in the column 307 (priority order) in the data configuration illustrated in FIG. 3.

At step S412, the processor 106 determines whether there exists an inference model having the management number of the specified inference model in the column 304 (related node management number list). In a case where the management number of the specified inference model is registered in the column 304 (related node management number list), the processor 106 advances the process to step S413. On the other hand, the processor 106 returns the process to the caller in a case where the management number of the specified inference model has not been registered in the related node management number list. For example, in the data configuration illustrated in FIG. 3, a record having the management number of the inference model specified in the column 304 (related node management number list) is obtained to perform determination at the current step.

At step S413, the processor 106 specifies the inference model obtained at step S412 and subsequently calls step S405 to perform the process (i.e., recursively perform the process of FIG. 4B), and thereafter returns the process to the caller. Note that, although not illustrated in FIG. 4B, the processor 106 performs the process as many times as the number of inference models in a case where there exists a plurality of inference models obtained. On this occasion, the processor 106 may call step S405 sequentially, or in parallel, to perform the process. In addition, the order of calling step S405 may be controlled using, for example, the values in the column 307 (priority order) according to the data configuration illustrated in FIG. 3. Furthermore, in a case where there exist a plurality of inference models of different types for the same classification, the object to be processed may be controlled using, for example, the value of the column 307 (priority order) in the data configuration illustrated in FIG. 3. For example, in the data configuration illustrated in FIG. 3, there exists a record (row 321) in which 107 and 109 have been set in the column 304 (related node management number list). Therefore, in a case where the management number of the specified inference model is "107" or "109", the processor 106 specifies the inference model of the record in the row 321 and calls step S405 to perform the process. This allows performing classification in terms of the types of cats or the types of dogs, and combinations of animals' expressions.

At step S414, the processor 106, having determined not to perform classification at S406, converts the classification result of the parent into a usable format and adds the converted format to the classification result of the inference model to be processed. The processor 106 sets the classification result as "dog" in order to convert the "Canidae, Canis" into a format usable even after terminating the process, when terminating the inference at a depth satisfying the user's interest.

Accordingly, the process of FIGS. 4A to 4B does not need to construct an inference model that performs classification for each user, and therefore eliminates the need to reconstruct the inference model that performs classification each time the depth of required classification varies according to the user over time, which allows performing classification required by the user. The processor 106 subsequently returns the process to the caller.

Figure 5B:
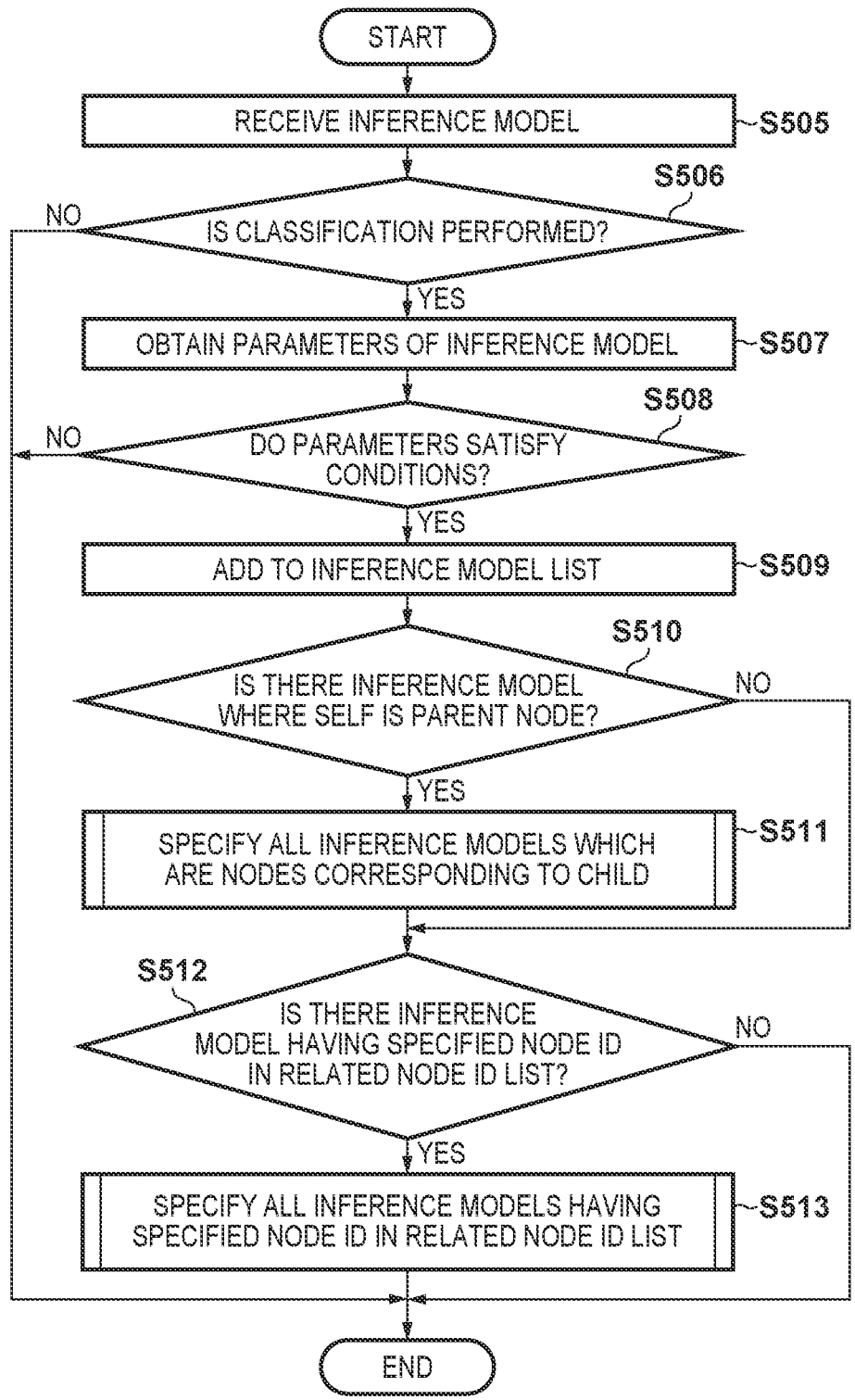

Next, an operation of the classification process in the PC 100 of the present embodiment will be described, referring to FIGS. 5A and 5B. Note that the present classification process outputs, instead of displaying, classification results for another information processing apparatus that performs classification. The processes illustrated in FIGS. 5A and 5B are realized by loading and executing on the RAM 108, by the processor 106 of the PC 100, a program stored in the ROM 107 or the HDD 109. Note that the process illustrated in FIG. 5B is called from the process illustrated in FIG. 5A, and repeatedly performed by a recursive call for sequentially processing parent-child relations in the tree structure.

At step S501, the processor 106 of the PC 100 initializes the inference model list. At step S502, the processor 106 obtains an inference model of the root node. In the example illustrated in FIG. 3, for example, the processor 106 obtains, as an object to be processed, an inference model managed by records of the rows 312, 313 and 322 in which neither the column 302 (parent node management number list) nor the column 304 (related node management number list) has been set. Note that the rows 312 and 313 correspond to the node group 201 illustrated in FIG. 2A, and the row 322 corresponds to the node group 213 illustrated in FIG. 2C.

At step S503, the processor 106 specifies an inference model of the root node obtained at step S502 to execute the classification process illustrated in FIG. 5B (call step S505). Note that, although not explicitly illustrated in the drawing, the classification process in FIG. 5B is performed for a plurality of times in accordance with the number of the root nodes in a case where there exists a plurality of root nodes obtained at step S502. On this occasion, the processes at and after step S405 illustrated in FIG. 4B may be performed sequentially or in parallel. Furthermore, at step S504, the processor 106 passes the inference model list generated at step S503 in accordance with the ability of another information processing apparatus that performs classification to the other information processing apparatus that performs classification. The processor 106 subsequently terminates the present classification process.

At step S505, the processor 106 receives the inference model specified at step S503. Note that, step S505 may also be called from steps S511 and S513 described below. In the aforementioned case, the processor 106 receives the inference model specified at steps S511 and S513. At step S506, the processor 106 determines whether to perform classification using the specified inference model. The processor 106, upon determining to perform classification using the specified inference model, advances the process to step S507. On the other hand, the processor 106, upon determining not to perform classification using the specified inference model, returns the process to the caller.

For example, in the data configuration of the present embodiment, a management number of an inference model not to be processed (the management number "109" in the example of FIG. 3) is set in the list 323 of management numbers of inference models not to be processed in order to set a depth in accordance with the user's interest. Therefore, the processor 106 returns the process to the caller in a case where the management number of the inference model specified at S403 coincides with "109" specified in the list 323 of management numbers of inference models not to be processed. Note that the processor 106 may perform depth adjustment using the list of management numbers of inference models to be processed, instead of the list of management numbers of inference models not to be processed. In the aforementioned case, the processor 106 returns the process to the caller when the inference model specified at S403 does not exist in the list. In the aforementioned manner, it is possible to perform classification at a depth satisfying the user's interest. Note that the depth information list 323 may be held for each user, or for each of other information processing apparatuses that perform classification.

At step S507, the processor 106 obtains parameters of the specified inference model. Subsequently, at step S508, the processor 106 determines whether the obtained parameters of the inference model satisfy the conditions of another information processing apparatus that performs classification. The processor 106, upon determining that the obtained parameters of the inference model satisfy the conditions, advances the process to step S509, or return the process to the caller, upon determining that the obtained parameters of the inference model do to not satisfy the conditions. In the example data configuration illustrated in FIG. 3, for example, the processor 106 refers to the column 306 (reference processing time) to determine whether the reference processing time accumulated from the root node has exceeded the expected processing time. The processor 106, upon determining that the accumulated reference processing time has exceeded the expected processing time, determines that the conditions of the other information processing apparatus that performs classification is not satisfied, and returns the process to the caller. In other words, the processor 106 does not set the depth of the classification to be deeper than the current state.

Additionally, in the example of data configuration illustrated in FIG. 3, the processor 106 refers to the column 305 (size of inference models) and the column 307 (priority order). The processor 106 then may select inference models to be processed so as to limit the objects to be processed in the classification process to inference models having high values in the column 307 (priority order), when accumulated size of the inference models from the root node in the list of inference models has exceeded a predetermined size. Alternatively, the processor 106 may select inference models to be processed using the conditions described in the column 310 (capabilities required for processing), in the example of data configuration illustrated in FIG. 3. In other words, the processor 106 performs control in a manner sequentially traversing node groups in accordance with the capability of the information processing apparatus based on the capability required for processing the column 310. This allows realizing determination of whether to perform a classification process required to be completed within a certain period of time, or execution of a classification process conforming to the capability of the information processing apparatus. Note that the items of the parameters are not limited to the items illustrated in FIG. 3.

At step S509, the processor 106 adds the inference model specified at S503 to the list of inference models. At step S510, the processor 106 determines whether there exists an inference model (i.e., a node corresponding to a child) having the inference model specified at S503 (i.e., the inference model to be processed) as the parent node. In the example of data configuration illustrated in FIG. 3, for example, the processor 106 obtains a record having the management number of the inference model specified in the column 302 (management number list of parent nodes) to perform determination. The processor 106 advances the process to step S511 when there exists an inference model having the inference model specified in S503 as the parent node. On the other hand, the processor 106 advances the process to step S512 when there exists no inference model having the specified inference model as the parent node.

At step S511, the processor 106 specifies the inference model obtained at step S510 (i.e., a node corresponding to a child) and subsequently calls step S505 to recursively perform the classification process illustrated in FIG. 5B. Note that, although not illustrated in the drawing, the processor 106 performs the process as many times as the number of inference models in a case where there exists a plurality of inference models obtained. On this occasion, the processor 106 may call step S505 sequentially, or in parallel, to perform the process.

At step S512, the processor 106 determines whether the management number of the specified inference model exists in the column 304 (related node management number list). The processor 106 advances the process to step S513 in a case where the management number of the specified inference model exists in the column 304 (related node management number list). On the other hand, the processor returns the process to the caller in a case where management number of the specified inference model does not exist in the column 304 (related node management number list). At step S513, the processor 106 specifies the inference model obtained at step S512 and calls step S505. Subsequently, after having performed the process, the processor 106 returns the process to the caller. Note that, although not illustrated in the drawing, the processor 106 performs the process as many times as the number of inference models in a case where there exists a plurality of inference models obtained. On this occasion, the processor 106 may call step S505 sequentially, or in parallel, to perform the process. This allows the processor 106 to generate management data of the inference model in accordance with various conditions of another information processing apparatus that performs classification in accordance with the user, and to pass the management data to the other information processing apparatus that performs classification.

Note that, for convenience of explanation, the description above has been provided taking as an example a case of passing the inference model list to another information processing apparatus. However, for example, the management data of the generated inference model and the management data of the inference model which has already been passed to another information processing apparatus that performs classification may be compared so as to update only the difference.

The present embodiment described above performs a process of classifying an object of interest using node group information represented as a tree structure of an inference model. On this occasion, it is intended to set depth information for determining whether to perform classification for a particular node group when sequentially traversing node groups from the parent node in the tree structure using the node group information to classify the object of interest, and control the depth of the node group for which classification is performed. This allows providing a classification result at a depth in accordance with the user or the information processing apparatus. In addition, it is not necessary to reconstruct the inference model that performs classification each time the depth of required classification varies according to the user over time, which allows performing classification required by the user.

Second Embodiment

Next, an embodiment in which adding or varying the depth of a node group is possible will be described. Note that the PC 100 according to the present embodiment may use the same configuration as that of the first embodiment. Therefore, same reference numerals will be used for configurations and processes substantially identical to those of the first embodiment, with duplicate description omitted. Note that, in the present embodiment, the following description takes, as an example of depth list, a list whose elements store node groups. However, the depth list is not limited to the aforementioned example and may store management numbers of records defined in the management table, similarly to the first embodiment.

Figure 6A:
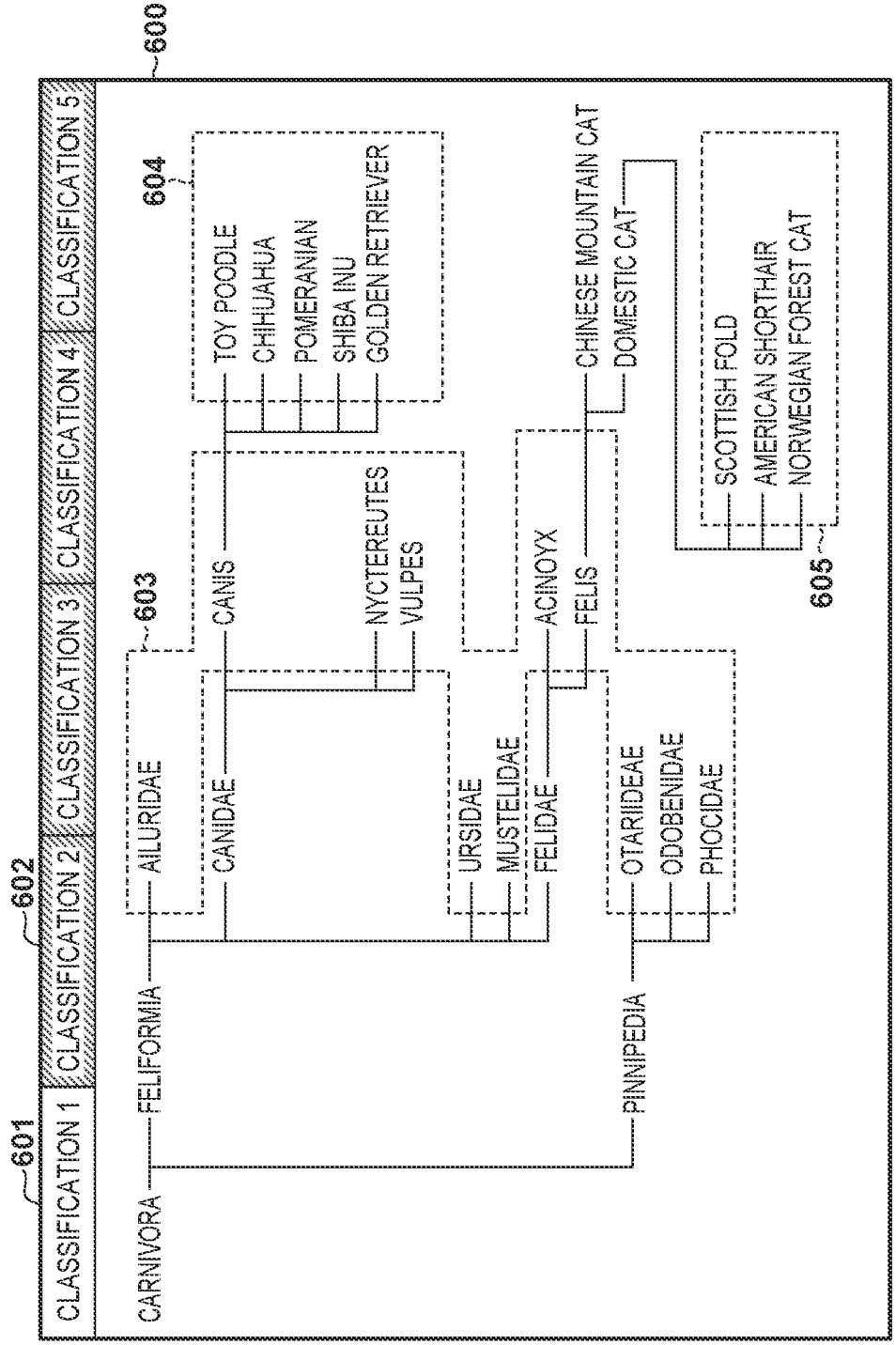
FIGS. 6A to 6B are explanatory diagrams of an example of a screen displaying the classification using the tree structure, according to a second embodiment.
Figure 6B:
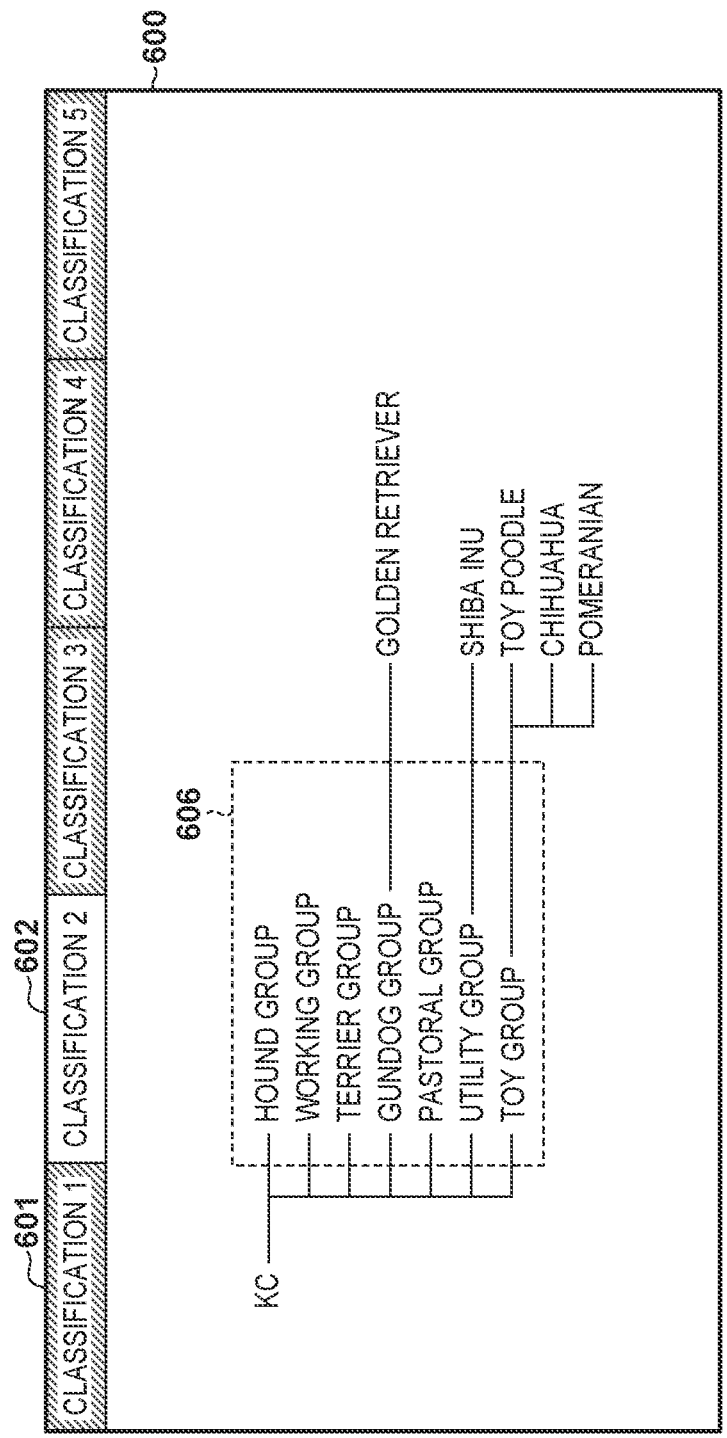

Referring to FIGS. 6A and 6B, an example of a screen 600 displayed on the display 101 of the PC 100 will be described. The screen 600 is configured so that views of classification to be set are switchable by pressing tabs 601 and 602 to switch between classifications. FIG. 6A illustrates a setting screen with a view of classification selected by the tab 601. FIG. 6B, on the other hand, illustrates a setting screen with a view of classification selected by the tab 602. Note that the view of classification may be switched by pull-down or a menu instead of using a tab such as that illustrated in FIGS. 6A and 6B. In addition, the number of views of classification may be one or more, and the types of view of classification may include "artificial classification", "natural classification", or other classification schemes in specific fields, without being limited to the present embodiment.

An item 603, although a part of which is omitted for convenience of explanation, indicates the selection state of "*Carnivora*". For example, in the selection state of displaying the item 603, "lesser panda", "dog", "raccoon dog", "fox", "bear", "weasel", "cheetah", "cat", "sea lion", "walrus" and "seal" are displayed as classification results. An item 604 indicates a display example in a case where a type of dog is added to or deleted from the classification result. In addition, an item 605 indicates a region in a case where a type of cat is added to or deleted from the classification result.

For example, adding an item 605 in the selection state of the item 603 causes details such as "scottish fold" "american shorthair" to be displayed as a classification result on the classification view which had "cat" as a previous classification result. Note that, when displaying classification, all the items of a leaf corresponding to the end of the classification may be listed, or only a representative name may be displayed. Additionally, in a case where nodes are in a one-to-one correspondence so that some nodes may be omitted, the classification may be displayed with the nodes omitted. This allows a user to set the depth of classification in accordance with variation of the user's interest, for example, in a case where although the user had been interested only in "cats", the user eventually has come to be interested in "dogs" too.

An item 606 illustrated in FIG. 6B indicates a display state when classification of a node group is added or deleted in a case where classification with a different view has been selected (i.e., a case where the tab 602 has been selected). When, for example, adding the item 606 in a state with the item 603 being displayed, "gundog group", "toy group", or the like, are displayed as classification results, in addition to "dog", which is a classification in a state with the item 603 being displayed. This allows for a setting for adding the depth of classification to the currently set view of classification.

Figure 7A:
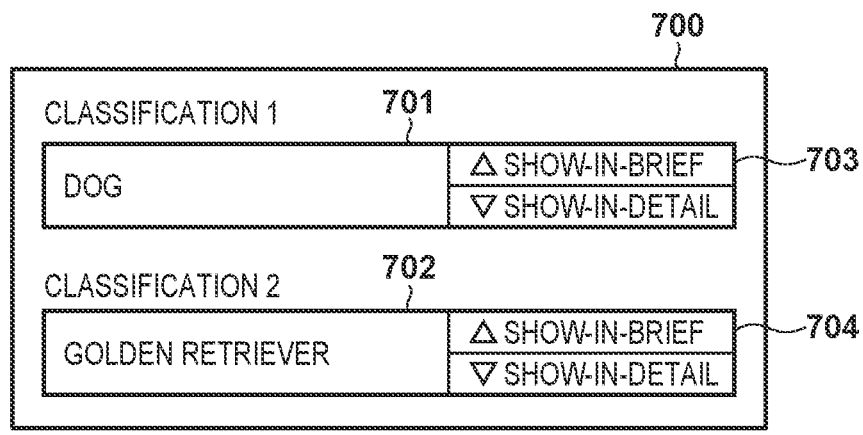
FIGS. 7A to 7B are explanatory diagrams of an example of a setting screen for changing depth of classification, according to the second embodiment.
Figure 7B:
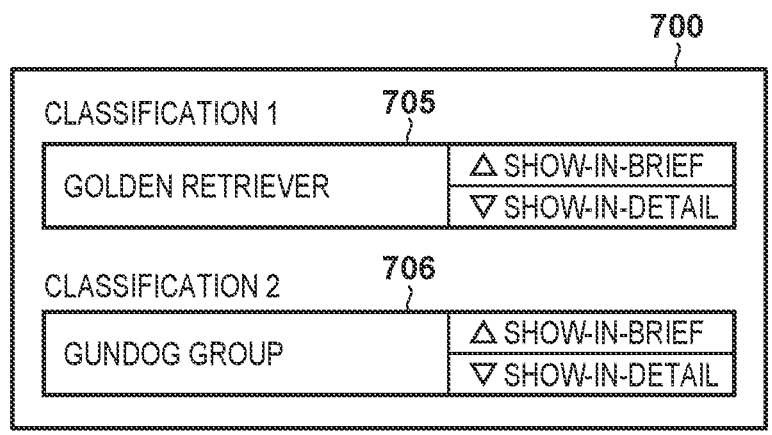

Furthermore, a screen configuration for depth adjustment according to the present embodiment will be described, referring to FIGS. 7A to 7B. FIG. 7A illustrates a setting screen 700 for adjusting the display of classification results and the depth of the results to be displayed on the display 101. In addition, FIG. 7B illustrates the screen after setting to be displayed on the settings screen 700 illustrated in FIG. 7A.

701 indicates a classification result displayed when the tab 601 corresponding to "classification 1" is selected, and 702 indicates a classification result displayed when the tab 602 corresponding to "classification 2" is selected. In addition, a show-in-detail button 703 stands for a button for changing the depth of the classification result to be displayed into a more detailed form. In addition, a show-in-brief button 704 stands for a button for changing the depth of the classification result to be displayed into an abbreviated from. 705 indicates a result of adjusting the state of a preset classification result 701 into a more detailed form using the show-in-detail button 703. 706 indicates a result of adjusting the classification result of a preset classification result 702 into a more abbreviated form using the show-in-brief button 704. This has made it possible to change the depth information for determining whether to perform classification for the node group toward the parent node (abbreviated form) or toward the child node (detailed form) in accordance with the user's operation. This allows adjusting the depth of classification for the classification result to be displayed and, in subsequent classifications, displaying the depth using the adjusted setting value. Note that, for convenience of explanation, although classification results from two views are displayed, there may be one or more views, without being limited to the present embodiment.

Figure 8B:
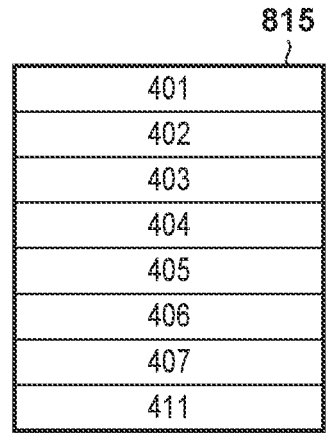

Next, a data configuration related to before and after adding or changing a classification will be described, referring to FIGS. 8A and 8B. FIG. 8A illustrates respective node group information before and after adding or changing the classification, and FIG. 8B illustrates a depth list according to the setting described above, referring to FIGS. 6A to 6B or FIGS. 7A to 7B. The depth list uses, for convenience, reference codes of the node groups illustrated in FIG. 8A as the node group numbers.

The node groups 801 to 809 illustrated in FIG. 8A represent node groups similar to the node groups described above referring to FIG. 3. In addition, the node groups 810 to 814 represent node groups configured to provide the display of the classification illustrated in FIG. 6B. A depth list 815 illustrated in FIG. 8B does not have the detailed node group number 809 for cat, and therefore the processor 106 controls so that the type of "cat" does not turn out to be the classification result. On the other hand, the depth list 815 has a node group number 811 indicating the group classification of "dog" with a different view, and therefore the processor 106 controls so that the group classification of "dog" with a different view turns out to be the classification result. Note that, in addition to the depth set in the setting screen described above referring to FIGS. 6A to 6B or FIGS. 7A to 7B, a depth list with a fixed depth in accordance with the capability of the device may be used, such as, for example, dynamic prediction in accordance with the subject being shot. In addition, similarly to the first embodiment, preparing the depth list 815 for each user allows managing the depth of classification for each user.

Figure 9:
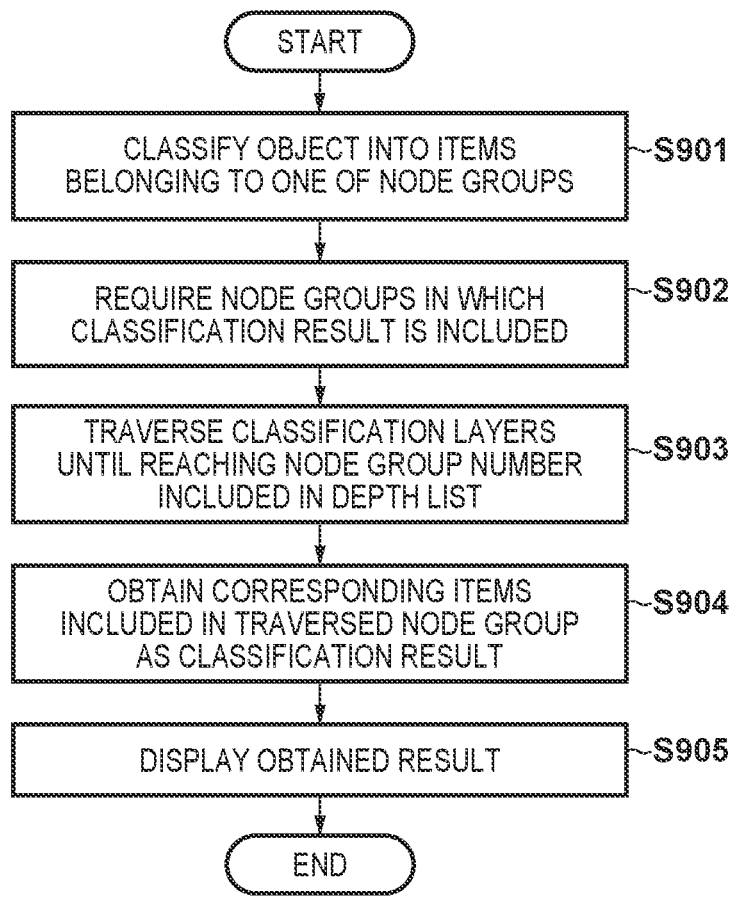
FIG. 9 is a flowchart illustrating an operation of a process for displaying the classification result, according to the second embodiment.

Next, an operation of the classification process in the PC 100 of the present embodiment will be described, referring to FIG. 9. Note that the classification process of the present embodiment is also realized by loading and executing on the RAM 108, by the processor 106 of the PC 100, a program stored in the ROM 107 or the HDD 109.

At step S901, the processor 106 uses the aforementioned inference model to classify an object (e.g., a subject in a captured image). On this occasion, the processor 106 classifies the object into items belonging to one of the node groups illustrated in FIG. 8A. When classifying an object at the current step, the object may be classified using a decision tree algorithm, for example. However, at the current step, it is not essential for the classification unit to classify the object along the classifications organized into a tree structure. For example, classification may be performed using deep learning or other machine learning algorithms to recognize the object so that the recognition result corresponds to one of the items belonging to the node groups.

At step S902, the processor 106 identifies the number of node groups for each node group illustrated in FIG. 8A by the classification result obtained at step S901. On this occasion, although not illustrated, the classification results may be included in a plurality of node groups. In a case where the classification result belongs to a plurality of node groups, the processor 106 performs the processes described below in respective node groups. In the example illustrated in FIG. 8A, for example, "golden retriever" belongs to node groups 807 and 812. Therefore, the processor 106 performs the following processes in each of the node groups.

At step S903, the processor 106 determines whether the node group number identified at step S902 is included in the depth list 815 illustrated in FIG. 8B. When the identified node group number is not included in the depth list 815, the processor 106 traverses the parent node until reaching the node group number included in the depth list 815.

At step S904, the processor 106 obtains, as a classification result, corresponding items included in the node group traversed at step S903. In the example illustrated in FIGS. 8A and 8B, although "golden retriever" belongs to the node groups 807 and 812, the node group number of the node group 812 is not included in the depth list 815. In such a situation, the node group 807 has been set in the depth list 815 of FIG. 8B when performing the process on the node group 807, and therefore the processor 106 may obtain the classification of "golden retriever" as it is. When, on the other hand, performing the process on the node group 812, the node group 812 is not set in the depth list of FIG. 8B, and therefore the processor 106 may traverse the parent nodes up to the node group 811 included in the depth list and obtain the corresponding item "gundog group".

At step S905, the processor 106 displays the classification result (e.g., "gundog group") obtained at step S904 on the display 101, as illustrated in FIG. 7A. The processor 106 terminates the process after the classification result is displayed.

Note that, in a case of using a classification result for the capability of a device such as, for example, dynamic prediction in accordance with the subject being shot, the classification result may be used for the capability of the device without being displayed on the display 101. In addition, although the present embodiment has described an example in which node group numbers are treated as information to be stored in the depth list 815, a keyword list may also be stored for each depth of classification for comparison between text strings.

As has been described above, the present invention makes it possible to set and vary depth of classification required by the user, whereby an object may be classified according to the depth of classification required by the user, without depending on the inference model or the like used for the classification. In addition, there is an advantage that it becomes unnecessary to individually construct an inference model in accordance with the depth of classification required by the user, which may vary according to the user over time.

Note that program codes supplied to and installed on a computer in order to realize the functional processes of the present invention by the computer are themselves intended to realize the present invention. In other words, also the computer programs for realizing the functional processes of the present invention are themselves included in the present invention. Any form of program, such as object codes, programs executed by an interpreter, script data supplied to the OS, or the like, may be included as long as they function as a program.

The storage medium for supplying programs may be, for example, a magnetic storage medium such as a hard disk, a magnetic tape or the like, an optical/magneto-optical storage medium, or a non-volatile semiconductor memory. In addition, a method for supplying a program may include a method for storing a computer program implementing the present invention in a server on a computer network, and downloading and executing the computer program by a connected client computer.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-013337, filed Jan. 29, 2019, which is hereby incorporated by reference herein in its entirety.

What is claimed is:

1. An information processing method in which an object of interest is classified using node group information defining a node group having modeled a scheme of classification as a tree structure and having grouped nodes possessing a same parent node, the method comprising:

setting depth information for determining whether to perform classification for a particular node group when sequentially traversing node groups from the parent node in the tree structure using the node group information to classify the object of interest; and classifying the object of interest by sequentially traversing node groups from the parent node in the tree structure and by performing the classification using an inference model which is associated with each of the traversed node groups using the node group information, and providing a classification result, wherein classifying the object of interest includes varying a depth up to which node groups are sequentially traversed from the parent node to classify the object of interest, in accordance with whether or not a node group traversed using the node group information corresponds to the particular node group set in of the depth information.

2. The information processing method according to claim 1, wherein the node group information includes information defining a node group having modeled one or more mutually independent schemes of classification as a tree structure and having grouped nodes possessing a same parent node.

3. The information processing method according to claim 1, further comprising displaying the classification result.

4. The information processing method according to claim 1, wherein classifying the object of interest includes classifying the object of interest using the node group information, by referencing a management table having associated the node group in the node group information with parameters related to the node group.

5. The information processing method according to claim 4, wherein the parameters of the management table include information of processing time required for a process of classifying the object of interest, and the classifying the object of interest includes controlling the depth up to which node groups are sequentially traversed from the parent node to classify the object of interest, by determining whether accumulated processing time from a root node exceeds a predetermined processing time based on information of the processing time.

6. The information processing method according to claim 4, wherein the parameters of the management table include information of size of the node group in the node group information, and the classifying the object of interest includes performing control so as to sequentially traverse node groups with a high priority, by determining whether the size accumulated from a root node exceeds a predetermined size based on the size information.

7. The information processing method according to claim 4, wherein the parameters of the management table include information of capability of an information processing apparatus required for processing the node group in the node group information, and the classifying the object of interest includes performing control so as to sequentially traverse node groups in accordance with capability of an information processing apparatus based on the capability information.

8. The information processing method according to claim 1, wherein the classifying the object of interest includes controlling the depth up to which node groups are sequentially traversed from the parent node to classify the object of interest, by determining whether a predetermined condition is satisfied based on the parameters.

9. An information processing apparatus that classifies an object of interest using node group information defining a node group having modeled a scheme of classification as a tree structure and having grouped nodes possessing a same parent node, the apparatus comprising:
   one or more processors; and
   a memory storing instructions which, when the instructions are executed by the one or more processors, cause the information processing apparatus to set depth information for determining whether to perform classification for a particular node group when sequentially traversing node groups from the parent node in the tree structure using the node group information to classify the object of interest; and
   classify the object of interest by sequentially traversing node groups from the parent node in the tree structure and by performing the classification using an inference model which is associated with each of the traversed node groups using the node group information, and provide a classification result,
   wherein the instructions cause the information processing apparatus to vary a depth up to which node groups are sequentially traversed from the parent node to classify the object of interest, in accordance with whether or not a node group traversed using the node group information corresponds to the particular node group set in setting of the depth information.

10. The information processing apparatus according to claim 9, wherein the instructions cause the information processing apparatus to classify the object of interest using the node group information, by referencing a management table having associated the node group in the node group information with parameters related to the node group.

11. The information processing apparatus according to claim 10, wherein the parameters of the management table include information of processing time required for a process of classifying the object of interest, and
   the instructions cause the information processing apparatus to control the depth up to which node groups are sequentially traversed from the parent node to classify the object of interest, by determining whether accumulated processing time from a root node exceeds a predetermined processing time based on information of the processing time.

12. The information processing apparatus according to claim 10, wherein the parameters of the management table include information of size of the node group in the node group information, and
   the instructions cause the information processing apparatus to perform control so as to sequentially traverse node groups with a high priority, by determining whether the size accumulated from a root node exceeds a predetermined size based on the size information.

13. The information processing apparatus according to claim 10, wherein the parameters of the management table include information of capability of an information processing apparatus required for processing the node group in the node group information, and
   the instructions cause the information processing apparatus to perform control so as to sequentially traverse node groups in accordance with capability of an information processing apparatus based on the capability information.

14. The information processing apparatus according to claim 9, wherein the instructions cause the information processing apparatus to control the depth up to which node groups are sequentially traversed from the parent node to classify the object of interest, by determining whether a predetermined condition is satisfied based on the parameters.

15. The information processing apparatus according to claim 9, wherein the node group information includes information defining a node group having modeled one or more mutually independent schemes of classification as a tree structure and having grouped nodes possessing a same parent node.

16. The information processing apparatus according to claim 9, further comprising displaying the classification result.

17. A non-transitory computer-readable storage medium storing a program for causing an information processing apparatus that classifies an object of interest using node group information defining a node group having modeled a scheme of classification as a tree structure and having grouped nodes possessing a same parent node to execute an information processing method, the information processing method comprising:
   setting depth information for determining whether to perform classification for a particular node group when sequentially traversing node groups from the parent node in the tree structure using the node group information to classify the object of interest; and
   classifying the object of interest by sequentially traversing node groups from the parent node in the tree structure and by performing the classification using an inference model which is associated with each of the traversed node groups using the node group information, and providing a classification result,
   wherein the classifying the object of interest includes varying a depth up to which node groups are sequentially traversed from the parent node to classify the object of interest, in accordance with whether or not a node group traversed using the node group information corresponds to the particular node group set in the depth information.

* * * * *